(12) United States Patent
Briggs et al.

(10) Patent No.: US 10,518,902 B2
(45) Date of Patent: Dec. 31, 2019

(54) UAV CAPTURE SYSTEM

(71) Applicant: Lockheed Martin Corporation, Bethesda, MD (US)

(72) Inventors: David C. Briggs, Edgewood, MD (US); Corey A. Fleischer, Abingdon, MD (US); Greg W. Klein, Bel Air, MD (US); Adam M. Knabe, Nottingham, MD (US); George Gregory Miller, Blatimore, MD (US); Michael W. Poppek, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 234 days.

(21) Appl. No.: 15/554,934

(22) PCT Filed: Mar. 14, 2016

(86) PCT No.: PCT/US2016/022339
§ 371 (c)(1),
(2) Date: Aug. 31, 2017

(87) PCT Pub. No.: WO2016/149198
PCT Pub. Date: Sep. 22, 2016

(65) Prior Publication Data
US 2018/0086481 A1 Mar. 29, 2018

Related U.S. Application Data

(60) Provisional application No. 62/133,113, filed on Mar. 13, 2015, provisional application No. 62/182,806, filed on Jun. 22, 2015.

(51) Int. Cl.
*B64F 1/02* (2006.01)
*B64C 39/02* (2006.01)

(52) U.S. Cl.
CPC .............. *B64F 1/02* (2013.01); *B64C 39/024* (2013.01); *B64C 2201/182* (2013.01); *B64F 1/025* (2013.01)

(58) Field of Classification Search
CPC ...... B64C 25/68; B64C 2201/182; B64F 1/02
See application file for complete search history.

(56) References Cited

U.S. PATENT DOCUMENTS

| 4,147,317 A | 4/1979 | Mayhew et al. |
| 4,753,400 A * | 6/1988 | Reuter ...................... B64F 1/02 244/110 R |

(Continued)

FOREIGN PATENT DOCUMENTS

WO       0075014 A1    12/2000

OTHER PUBLICATIONS

International Search Report and Written Opinion of the International Searching Authority for PCT/US2016/022339 filed on Mar. 14, 2016, dated Jun. 23, 2016.

*Primary Examiner* — Joseph W Sanderson
(74) *Attorney, Agent, or Firm* — Reising Ethington P.C.

(57) ABSTRACT

A UAV capture system including a cable array comprising at least two laterally-spaced cables carried by a first cable support structure. Catches disposed on respective port and starboard wings of a UAV are positioned to engage the cables when the UAV flies into them. A payout device pays out the engaged cables after they have been engaged by the UAV and a brake decelerates the UAV by resisting the pay out of the cables.

13 Claims, 8 Drawing Sheets

(56) References Cited

U.S. PATENT DOCUMENTS

| | | | |
|---|---|---|---|
| 6,264,140 B1 | 7/2001 | McGeer et al. | |
| 6,874,729 B1 | 4/2005 | McDonnell | |
| 7,059,564 B2 | 6/2006 | Dennis | |
| 7,097,137 B2 | 8/2006 | McDonnell | |
| 7,114,680 B2 * | 10/2006 | Dennis | B64C 39/024 244/63 |
| 7,175,135 B2 * | 2/2007 | Dennis | B64C 25/68 244/110 C |
| 7,219,856 B2 * | 5/2007 | Watts | B64F 1/02 244/110 F |
| 7,578,467 B2 * | 8/2009 | Goodrich | B64F 1/02 244/110 C |
| 7,611,094 B2 * | 11/2009 | Rom | B64C 39/024 244/110 C |
| 8,167,242 B2 | 5/2012 | McDonnell | |
| 8,276,844 B2 * | 10/2012 | Kariv | B64F 1/06 244/110 C |
| 8,453,967 B2 * | 6/2013 | Miller | B64F 1/02 244/110 C |
| 8,783,607 B2 * | 7/2014 | Allen | B64F 1/02 114/241 |
| 9,527,604 B2 * | 12/2016 | Melish | B64F 1/02 |
| 9,669,947 B2 * | 6/2017 | Zwaan | B64F 1/02 |
| 9,862,503 B2 * | 1/2018 | Chavez, Jr. | B64F 1/02 |
| 2002/0100838 A1 * | 8/2002 | McGeer | B64C 25/68 244/116 |
| 2006/0249623 A1 * | 11/2006 | Steele | B64F 1/02 244/116 |
| 2007/0051849 A1 * | 3/2007 | Watts | B64F 1/02 244/110 F |
| 2009/0224097 A1 * | 9/2009 | Kariv | B64F 1/02 244/63 |
| 2010/0025528 A1 | 2/2010 | Jackson | |
| 2012/0032025 A1 * | 2/2012 | Allen | B64F 1/02 244/110 C |
| 2016/0144980 A1 * | 5/2016 | Kunz | B64F 1/02 244/110 C |

* cited by examiner

UAV CAPTURE SYSTEM

CROSS-REFERENCES TO RELATED APPLICATIONS

This application claims priority in U.S. Provisional Patent Application Ser. No. 62/133,113 filed Mar. 13, 2015; and U.S. Provisional Patent Application Ser. No. 62/182,806 filed Jun. 22, 2015; which are incorporated herein by reference in their entireties.

BACKGROUND

Field

This application relates generally to a capture system for an unmanned air vehicle (UAV).

Description of Related Art

Known UAV capture systems generally employ either nets or a single vertical cable to recover UAVs from flight. Known single vertical cable systems arrest just one wing of a UAV, as shown in U.S. Pat. Nos. 6,264,140; 7,114,680; 7,175,135; and 7,578,467.

SUMMARY

A UAV capture system comprising a first cable support structure and a first cable array comprising at least two cables carried by the first cable support structure in respective positions such that at least portions of the two cables are spaced-apart. Port and starboard catches are disposed on respective port and starboard wings of a UAV to be captured, and are positioned to engage the spaced-apart cable portions when the UAV flies into the spaced-apart cable portions. A first cable array payout apparatus is connected to the engaged cables of the first cable array and comprises a payout device that pays out the engaged cables after they have been engaged by the a the UAV to be captured and resists such pay out to decelerate the UAV.

A method of capturing an airborne UAV by flying a UAV into and engaging spaced-apart portions of two cables of a first cable array carried by a first cable support structure, paying out the engaged cables of the first cable array, and decelerating the UAV by resisting pay out of the engaged cables of the first cable array.

DRAWING DESCRIPTIONS

DETAILED DESCRIPTION

Figure 1:
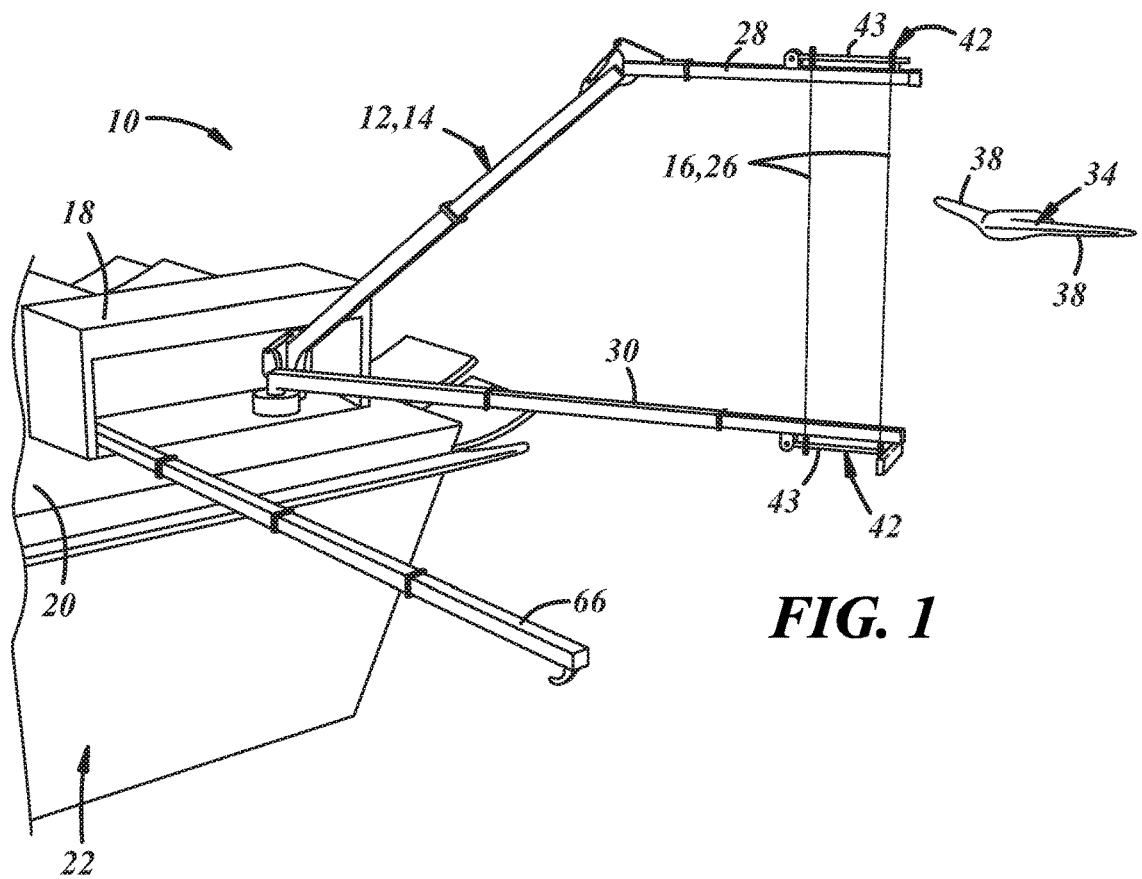
FIG. 1 is a perspective view of a UAV approaching a first embodiment of a vertical cable capture apparatus (VCC) of a first embodiment of a UAV capture system.
Figure 2:
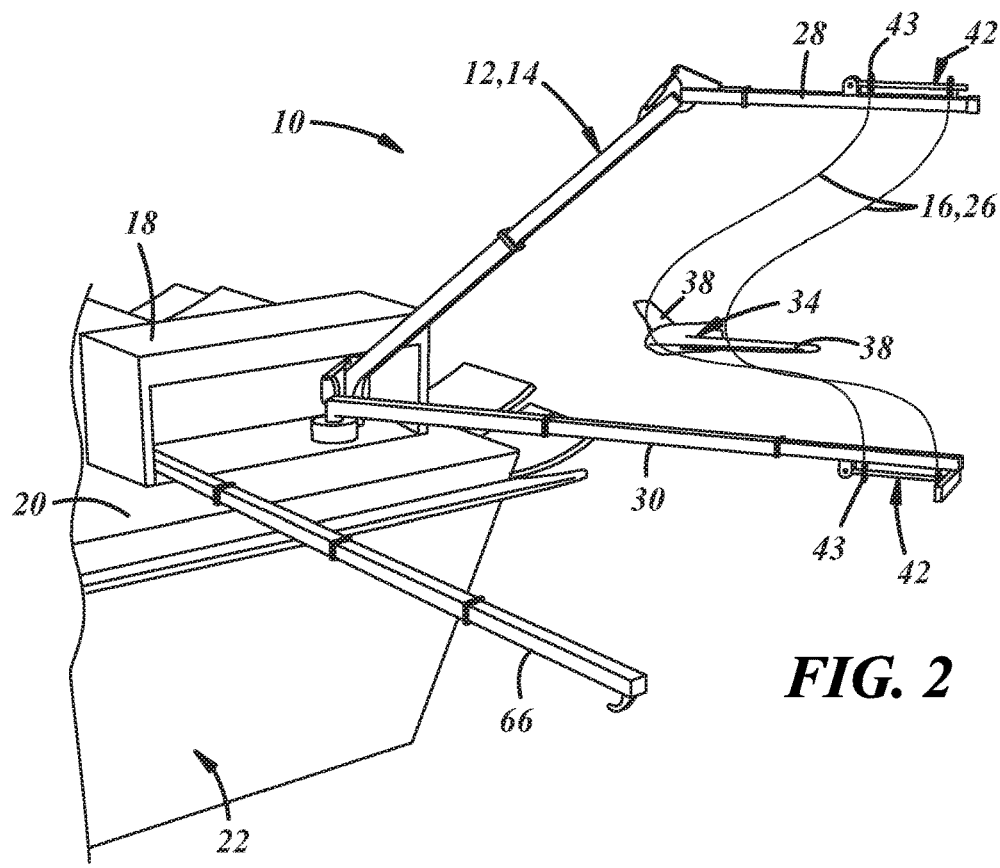
FIG. 2 is a perspective view of the UAV of FIG. 1 engaging two cables of the VCC of the UAV capture system embodiment of FIG. 1.
Figure 3:
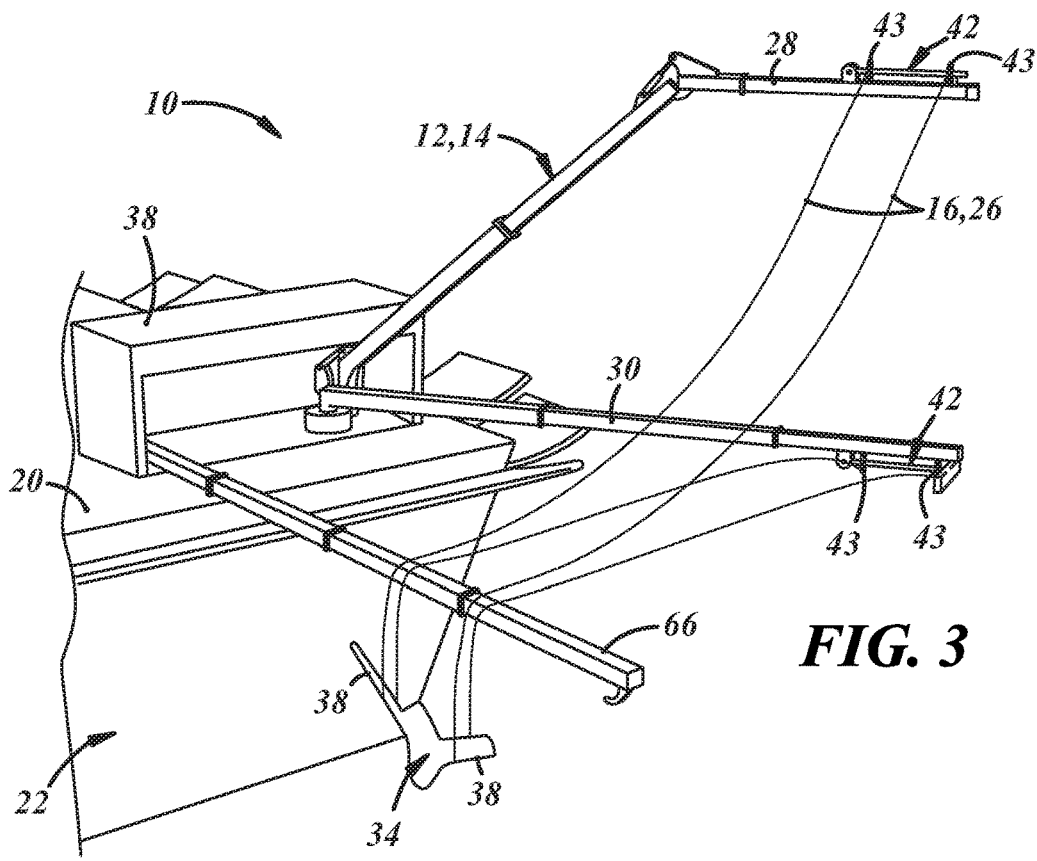
FIG. 3 is a perspective view of the UAV supported by the two cables draped over a cable catch bar of the UAV capture system embodiment of FIGS. 1 and 2.
Figure 4:
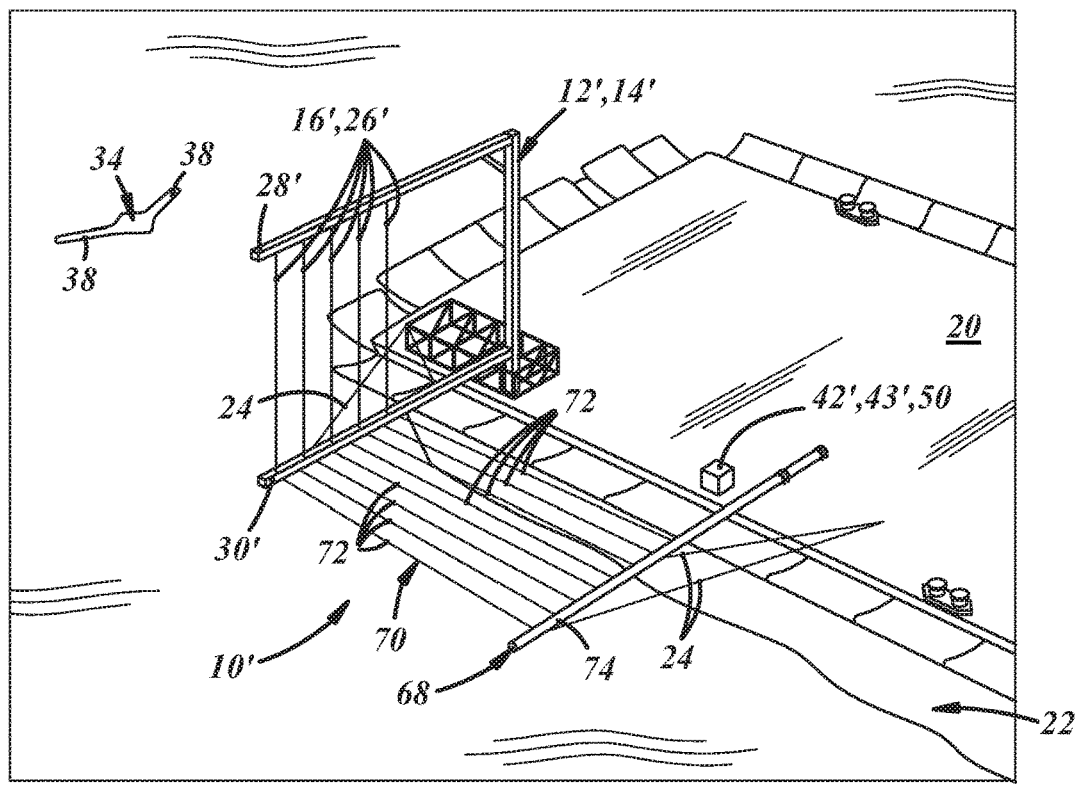
FIG. 4 is a perspective view of a UAV approaching a second embodiment of a vertical cable capture apparatus (VCC) of a first embodiment of a UAV capture system.
Figure 5:
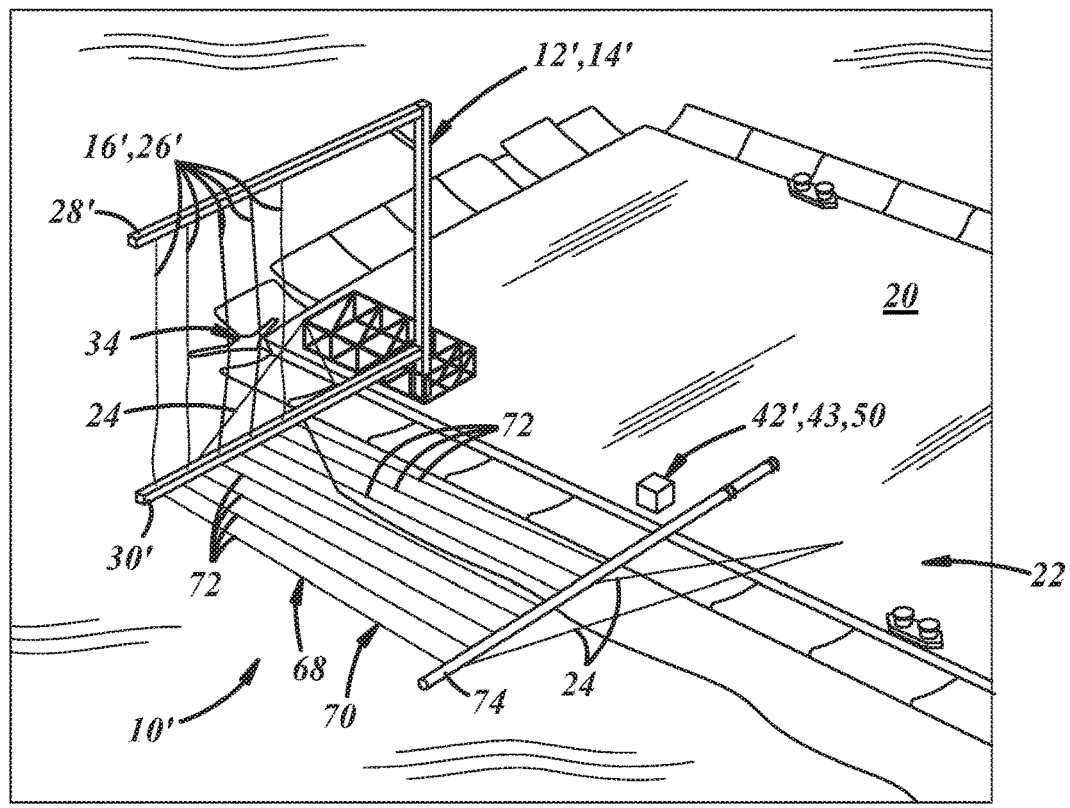
FIG. 5 is a perspective view of the UAV of FIG. 4 engaging two cables of the VCC of the UAV capture system embodiment of FIG. 4.

A first embodiment of a capture system for recovering an airborne unmanned air vehicle (UAV) is generally shown at 10 in FIGS. 1-3. A second embodiment is generally shown at 10' in FIGS. 4-13. Reference numerals with the designation prime (') in FIGS. 4-13 indicate alternative configurations of elements that also appear in the first embodiment. Unless indicated otherwise, where a portion of the following description uses a reference numeral to refer to FIGS. 1-3, that portion of the description applies equally to elements designated by primed numerals in FIGS. 4-13.

As shown in FIGS. 1-3, the UAV capture system 10 may comprise a vertical cable capture apparatus (VCC) 12 comprising a VCC support structure 14 and two or more VCC cables or lines 16. The VCC support structure 14 may be carried and supported by a standard intermodal shipping (ISO) container 18 which, in turn, may be fastened to the deck 20 of a ship 22 or any other suitable surface by any suitable manner, such as, for example, engaging ISO corner sockets of the ISO container with any suitable load reaction fitting, such as ISO sockets installed in a ship's deck 20 or other suitable surface. The VCC support structure 14 may be further secured with suitable tie outs and/or chain stays 24. The VCC support structure 14 may be of any size, shape, configuration, and construction suitable to support the VCC cables 16 or portions of the VCC cable 16.

Mid portions 26 of the VCC cables 16 may be supported between vertically-spaced upper and lower VCC cable support arms 28, 30 of the VCC support structure 14 such that the mid portions of the VCC cables 16 are disposed in generally linear, vertical, parallel, spaced-apart orientations.

Figure 11:
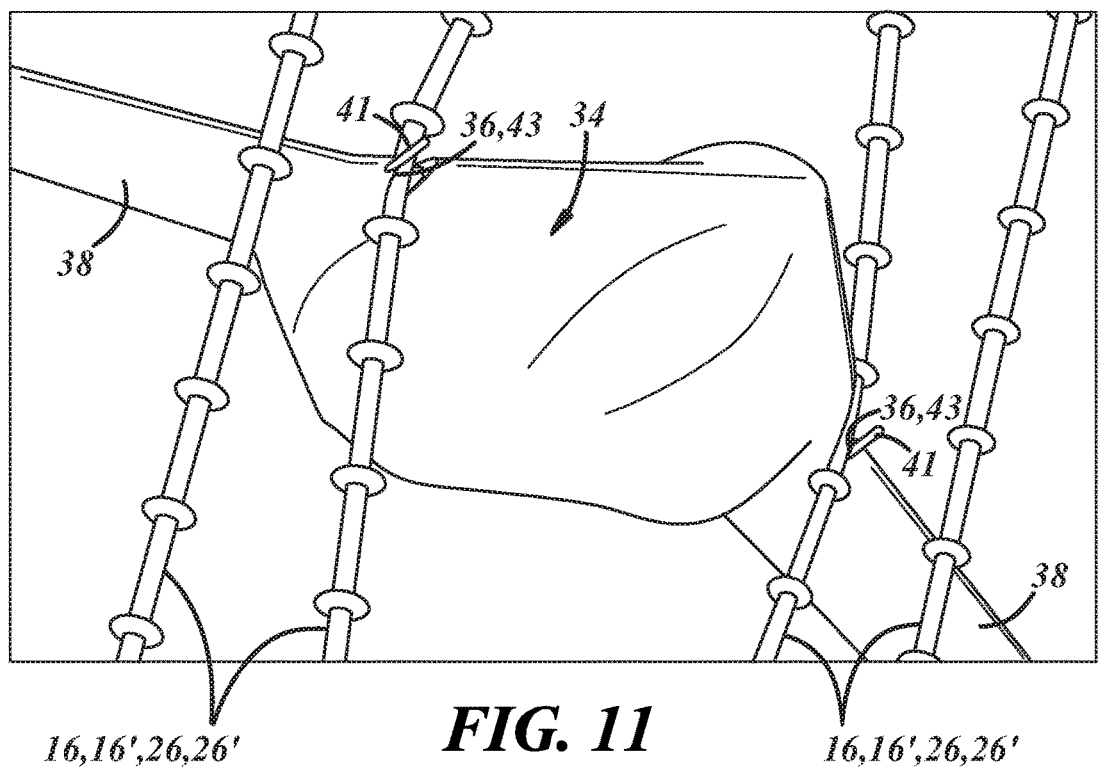
FIG. 11 is a perspective view of the UAV of FIGS. 9 and 10 engaging VCC cables.

As shown in FIG. 11, the VCC cables 16 may include respective pluralities of laterally-protruding bumps spaced along the lengths of the cables' respective mid portions 26. The bumps may be shaped as donut-shaped annular disks and may comprise a relatively soft, resilient material such as rubber. The bumps resist slipping of a captured UAV 34 relative to the VCC cable mid portions 26 when the VCC cables 16 are being used to lift and/or transport a UAV 34 following capture.

The VCC cables 16 may comprise material configured to avoid damaging the UAV 34. The VCC cables 16 may, for example, comprise nylon, aromatic polyamide (aramid), or any other suitable material.

The UAV capture system 10 may also comprise port and starboard catches 36 disposed on respective port and starboard wings 38 of a UAV 34 to be captured, in respective positions for engaging the spaced-apart VCC cable mid portions 26 when the UAV 34 is flown into the spaced-apart VCC cable mid portions 26. The VCC cables 16 may be supported on the VCC support structure 14 in respective positions such that there is, at some point along the mid portions 26 of the VCC cables 16, a spacing of less than a distance between the port and starboard catches 36 of a UAV 34 to be captured. Preferably the cable spacing at that point may be less than or equal to about half the distance between the catches 36.

Figure 8:
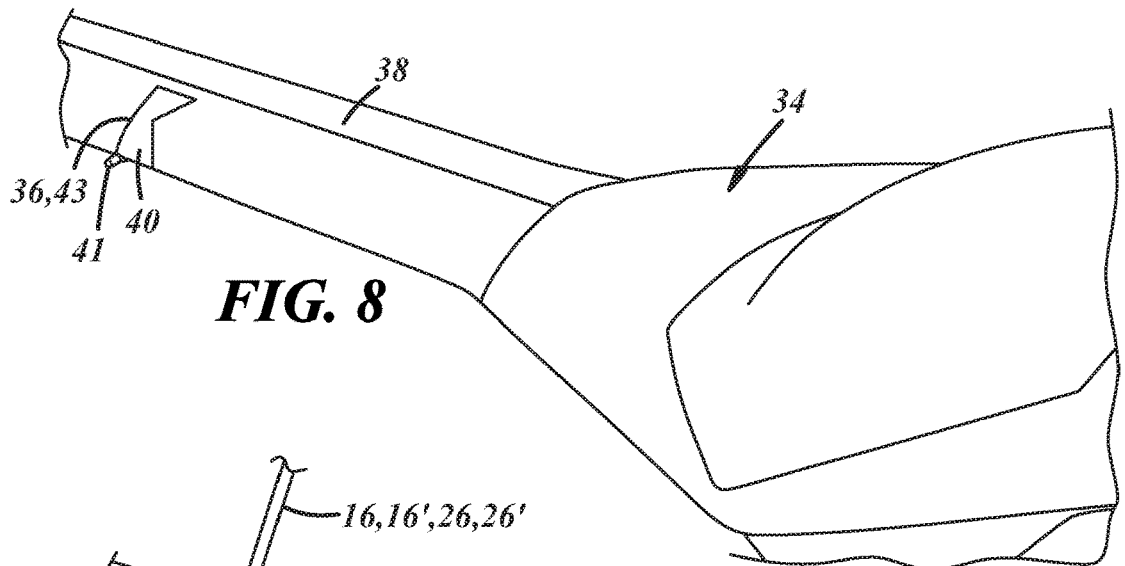
FIG. 8 is a magnified partial perspective view of a starboard cable catch in a starboard wing of a UAV, with a frangible fairing covering the catch.
Figure 9:
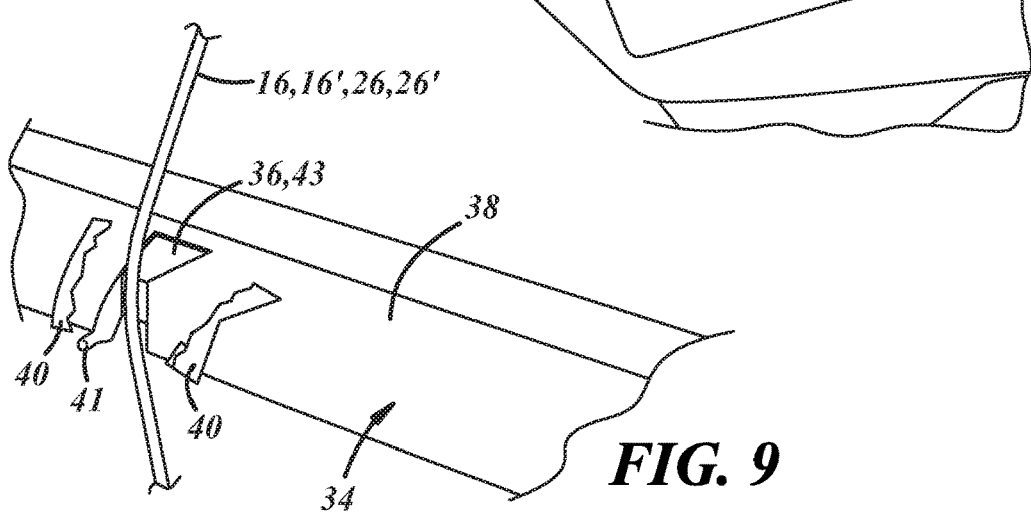
FIG. 9 is a magnified partial perspective view of one of the VCC cables fracturing the frangible fairing of FIG. 8 and being engaged by the starboard catch of FIG. 8.
Figure 10:
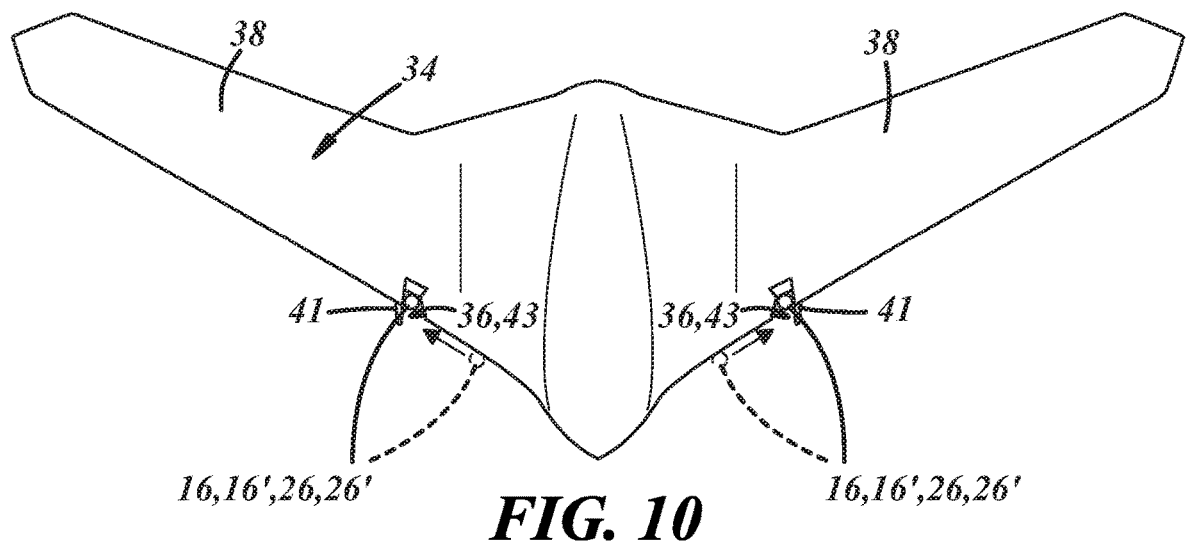
FIG. 10 is a top view of the UAV of FIG. 9 with VCC cables shown engaged in port and starboard catches in respective port and starboard wings of the UAV of FIG. 9.

As best shown in FIG. 10, portions of leading edges of the wings 38 of a UAV 34 to be captured may preferably be swept—at least along portions of the leading edges immediately inboard of the catches 36. The sweep of these portions of the UAV wing leading edges guides engaged VCC cables 16 outboard into the port and starboard catches 36. The catches 36 may preferably be disposed aft of a center of gravity of a UAV 34 to be captured. As shown in FIG. 8, the catches 36 may be covered by frangible fairings 40 shaped to match or approximate the curvature of the UAV leading edge where the catches 36 are located. The frangible fairings 40 thus reduce or eliminate any aerodynamic penalty attributable to the catches 36. The frangible fairings 40 are constructed to fracture when impacted by VCC cables 16 during UAV 34 capture as shown in FIG. 9.

As shown in FIGS. 8-11, the port and starboard catches 36 may comprise respective port and starboard protrusions 41, which may be carried by and may extend forward from the respective port and starboard wings 38 of the UAV 34. As is also shown in FIGS. 8-11, the protrusions 41 may extend from respective locations immediately outboard of recess portions 43 of the port and starboard catches 36. The protrusions 41 are thus positioned to block engaged VCC cables 16 from sliding outboard past the recess portions 43 of the port and starboard catches 36 in the leading edges of the port and starboard wings 38 of the UAV 34. In the embodiment shown in FIGS. 8-11 the protrusions 41 are generally cylindrical in shape, but may be of any suitable shape in other embodiments.

The UAV capture system 10 may further comprise a VCC cable payout apparatus 42 comprising a VCC payout device 43 connected to the VCC cables 16 and configured to pay out the VCC cables 16 after the mid portions 26 of the VCC cables 16 are engaged by the port and starboard catches 36 of a UAV 34 impacting the mid portions 26 of the VCC cables 16. As best shown in FIGS. 13-17 with respect to a VCC cable payout apparatus 42' of the second embodiment, the VCC cable payout apparatus 42' may also comprise cable guides such as pulleys 44, eyebolts 46, and fairleads 48, that may be carried by the VCC support structure 14' and positioned to guide trailing portions 50 of the VCC cables 16 as the VCC cables 16 pay out in response to UAV engagement.

Figure 13:
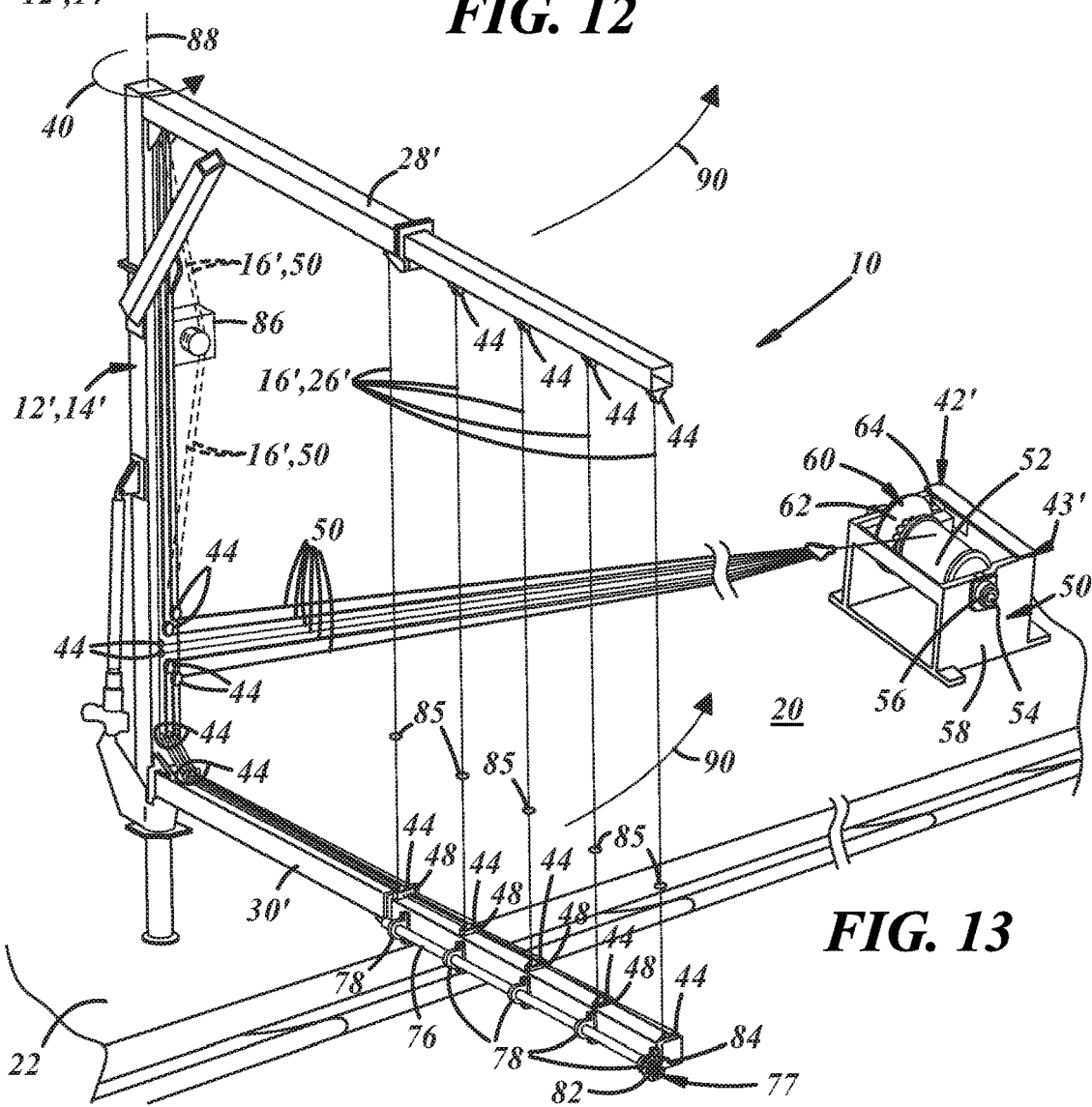
FIG. 13 is an orthogonal view of a VCC cable payout apparatus.
Figure 14:
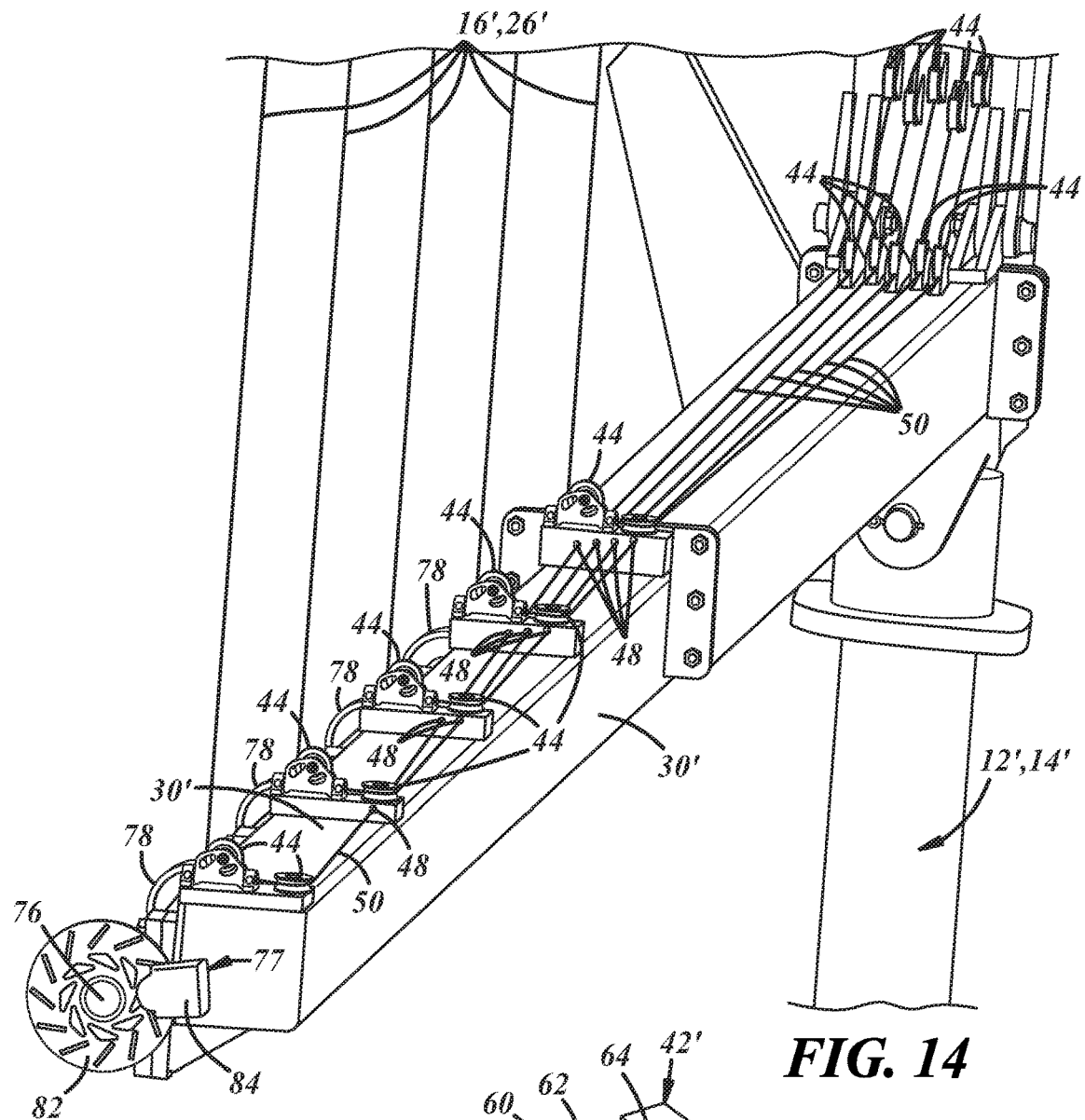
FIG. 14 is a magnified orthogonal view of a portion of the VCC cable payout apparatus of FIG. 13 distributed along a lower VCC cable support arm.
Figure 17:
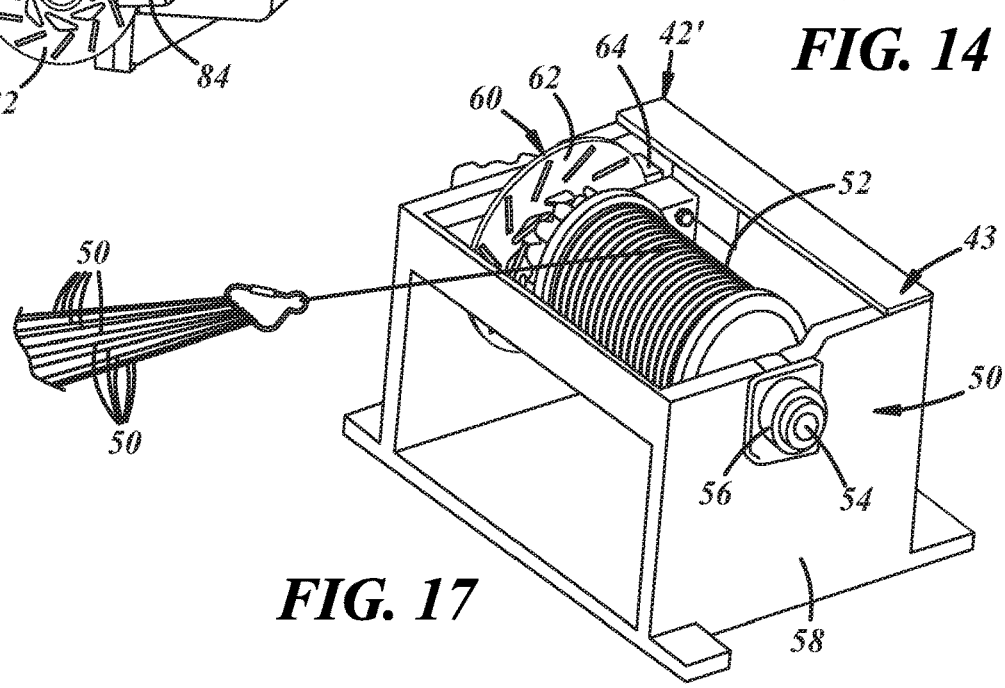
FIG. 17 is a magnified orthogonal view of a VCC cable payout device of the VCC cable payout apparatus of FIG. 13.
Figure 16:
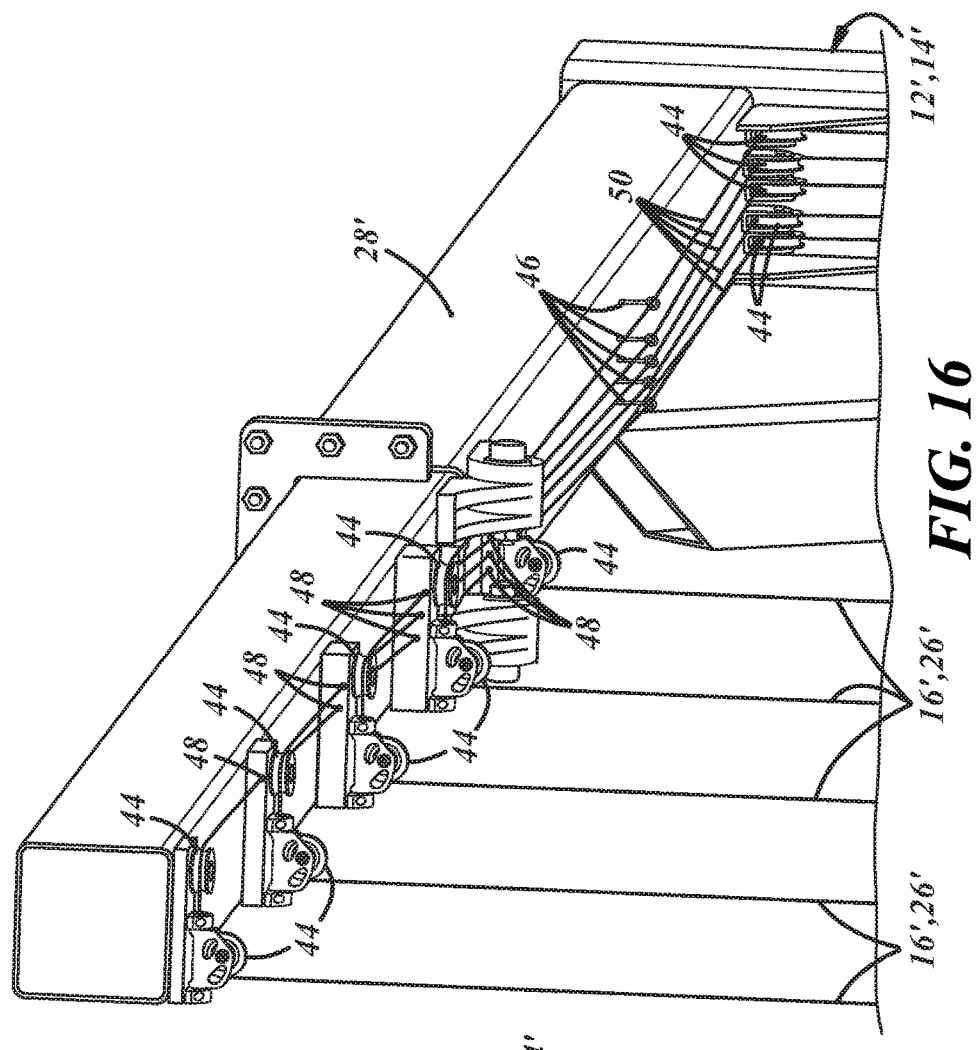
FIG. 16 is a magnified orthogonal view of a portion of the VCC cable payout apparatus of FIG. 13 distributed along an upper VCC cable support arm.
Figure 15:
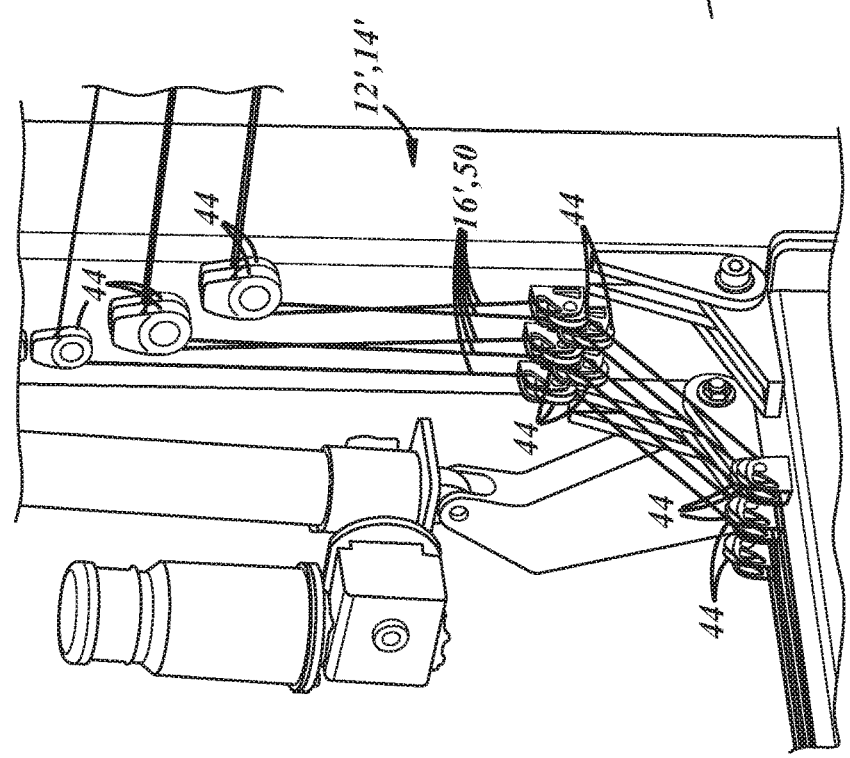
FIG. 15 is a magnified orthogonal view of a portion of the VCC cable payout apparatus of FIG. 13 distributed along an inner portion of the VCC cable support arm and a lower portion of an upright portion of the VCC cable support structure.

As is also best shown in FIG. 13 with respect to the second the payout apparatus 42' of the second embodiment, the VCC cable payout device 43' may include a VCC cable pay out reel 50 that may be disposed in a location remote from the VCC support structure 14'. The VCC cable pay out reel 50 may include a winding drum 52 supported for rotation about a winding drum axis on a drum axle 54 rotatably received at opposite drum axle ends in respective rotary bearings 56. The rotary bearings 56 may be carried by a reel support frame 58, which may be fixed to a surface such as the deck 20 of a ship 22. The trailing portions 50 of the VCC cables 16 may be connected to the winding drum 52, and may be wound around the winding drum 52 prior to UAV engagement of the VCC cable mid portions 26, and unwound from the winding drum 52 as the VCC cables 16 pay out following UAV engagement.

The VCC cable payout apparatus 42 may be configured to resist pay out of the VCC cables 16 following UAV engagement such that the UAV 34 is decelerated at a rate that does not damage the UAV 34. To that end, and as shown in FIGS. 13 and 18, the VCC cable payout apparatus 42 may include a VCC brake 60 operable to decelerate the UAV 34 by resisting pay out of the VCC cables 16' following UAV engagement. The VCC brake 60 may include a VCC brake disk 62 that may be coaxially fixed to the winding drum axle 54 of the VCC reel 50 and a VCC brake caliper 64 that may be carried by the VCC reel support frame 52 in a position to releasably apply clamping pressure to the VCC brake disk 62. The amount of clamping pressure applied by the VCC brake caliper 64 to the VCC brake disk 62 may be adjusted to a value suitable to decelerate a UAV 34 to be captured, based on UAV mass and an anticipated final approach speed of the UAV 34 relative to the UAV capture system 10.

According to the first UAV capture system embodiment, the system 10 may include a cable catch bar 66 supported in a generally horizontal orientation and in a position forward of the VCC support structure 14 for the VCC cables 16 to drape over the cable catch bar 66 and suspend a captured UAV 34 following UAV engagement. In other words, the cable catch bar 66 may be positioned so that, as the VCC cables 16 pay out, and as the UAV 34 loses flying airspeed and forward momentum, the paid-out VCC cables 16 will fall across the catch bar 66, allowing the catch bar 66 to define a pivot point around which the UAV 34 swings downward and is suspended below the cable catch bar by the VCC cables 16. The cable catch bar 66 may preferably be spaced far enough above a surface below, to preclude the UAV 34 from striking the surface below as the UAV 34 swings downward on the paid-out VCC cables 16.

Figure 12:
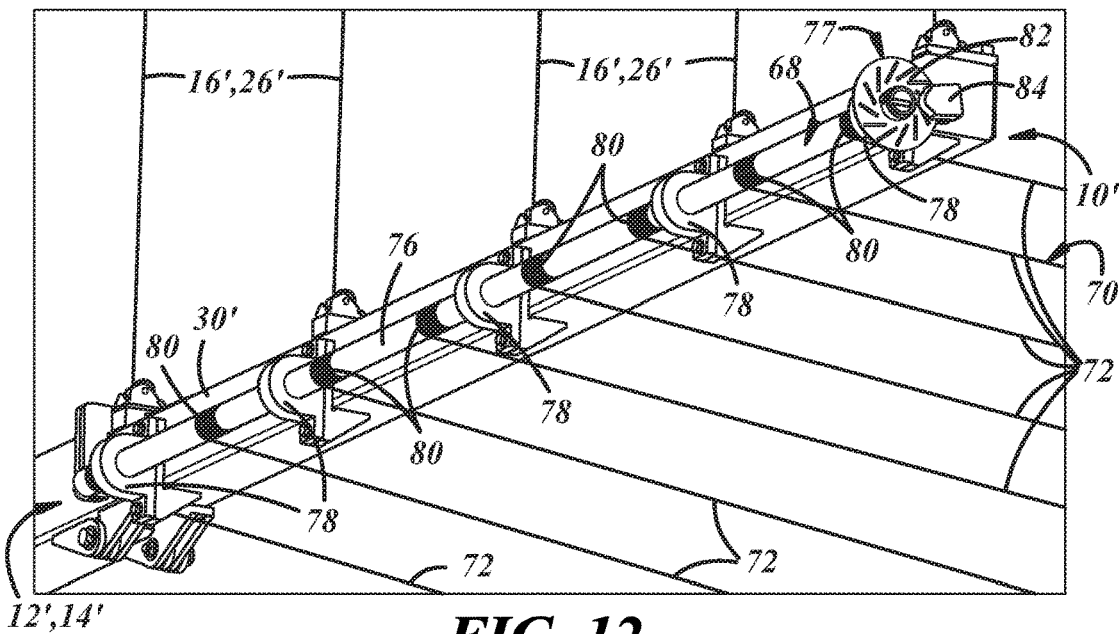
FIG. 12 is a magnified orthogonal view of an HCC cable payout apparatus of the HCC of FIG. 6.

According to the second UAV capture system embodiment, the system 10' may also or alternatively include a horizontal cable capture apparatus (HCC) 68 configured to catch or receive the UAV 34 as the VCC cables 16' pay out and diminish forward motion of the UAV 34. The HCC 68 may comprise a landing pad 70 that may include an array of spaced-apart HCC cables or lines 72 disposed below and in general alignment with a post-VCC engagement flight path of a UAV 34 to be captured, i.e., a flight path that the UAV 34 follows after engaging the VCC cables 16'. The HCC landing pad 70 may also include an HCC cable support arm 74, as shown in FIGS. 4-7 and a rotary HCC cable pay out rod 76 supporting respective forward and aft ends of the HCC cables 72, as shown in FIGS. 12 and 13.

The HCC cables 72 may comprise material configured to avoid damaging the UAV 34. The HCC cables 72 may, for example, comprise nylon, aromatic polyamide (aramid) fiber, or any other suitable material. The HCC cables 72 may be spaced approximately one-quarter UAV wingspan apart from one another at the aft rotary HCC cable pay out rod 76, and may be spaced farther apart at the forward HCC cable support arm 74.

The UAV capture system 10' may also include an HCC cable payout apparatus that may comprise the HCC cable pay out rod 76 and an HCC brake 77. As shown in FIGS. 12 and 13, the HCC cable pay out rod 76 may be supported for rotation about a longitudinal rod axis by a series of rotary bearings 78 carried by the lower VCC cable support arm 30'. As shown in FIG. 13, the aft ends of the HCC cables 72 may be connected to the HCC cable pay out rod 76 and wound around the rod 76 to form windings 80 prior to UAV engagement, and may then be unwound from the HCC cable pay out rod 76 as the HCC cables 72 pay out following UAV 34 engagement.

The HCC brake 77 is operable to decelerate the UAV 34 by resisting pay out of the HCC cables 72 following UAV engagement of the HCC cables 72, such that a remainder of the UAV's kinetic energy is dissipated at a rate that does not damage the UAV 34. As best shown in FIG. 12, the HCC brake 77 may include an HCC brake disk 82 coaxially fixed to the HCC cable pay out rod 76, and an HCC brake caliper 84 carried by the lower VCC cable support arm 30' in a position to releasably apply clamping pressure to the HCC brake disk 82. The amount of clamping pressure applied by the HCC brake caliper 84 to the HCC brake disk 82 may be adjusted to a value suitable to absorb any remaining kinetic and/or gravitational potential energy remaining in a UAV 34 following VCC cable engagement and pay out. Such adjustment may be based on UAV mass and available vertical clearance beneath the HCC cables 72.

The UAV capture system 10 may include bumps 85 fixed in respective positions on the VCC cable mid portions 26' below a likely UAV impact point, as shown in FIG. 13 (HCC removed for clarity). The UAV capture system 10 may also include a winch, shown schematically at 86 in FIG. 13, which may be carried by the VCC support structure 12' or in any other suitable location to allow slack trailing portions 50 of engaged VCC cables 16' to be wrapped around the winch 86 following UAV capture. After wrapping the slack portions 50 of the VCC cables 16' around the winch 86, the winch may be activated to reel-in the engaged VCC cables 16', drawing the captured UAV 34 aft along the HCC cables 72 toward the VCC support structure 12'. Once the UAV 34 has been drawn aft far enough for the catches 36 to engage the bumps 85 in the engaged VCC cables 16', continued winch operation then results in the engaged VCC cables 16' lifting and suspending the UAV 34 from the VCC support structure 12'. Preferably, the center of gravity of the UAV 34 is disposed forward of the catches 36, so that the UAV 34 will remain in a nose-down attitude once hoisted above the HCC cables 72. The VCC support structure 12' may then be swung about a VCC support structure axis 88 in a direction indicated by arrows 90, until the captured, hoisted UAV 34 is positioned over the deck 20 of a ship 22 upon which the UAV capture system 10 is mounted. The UAV 34 may then be lowered to the deck 20 of the ship 22, and lowered to the deck 20 by reversing the winch.

Figure 6:
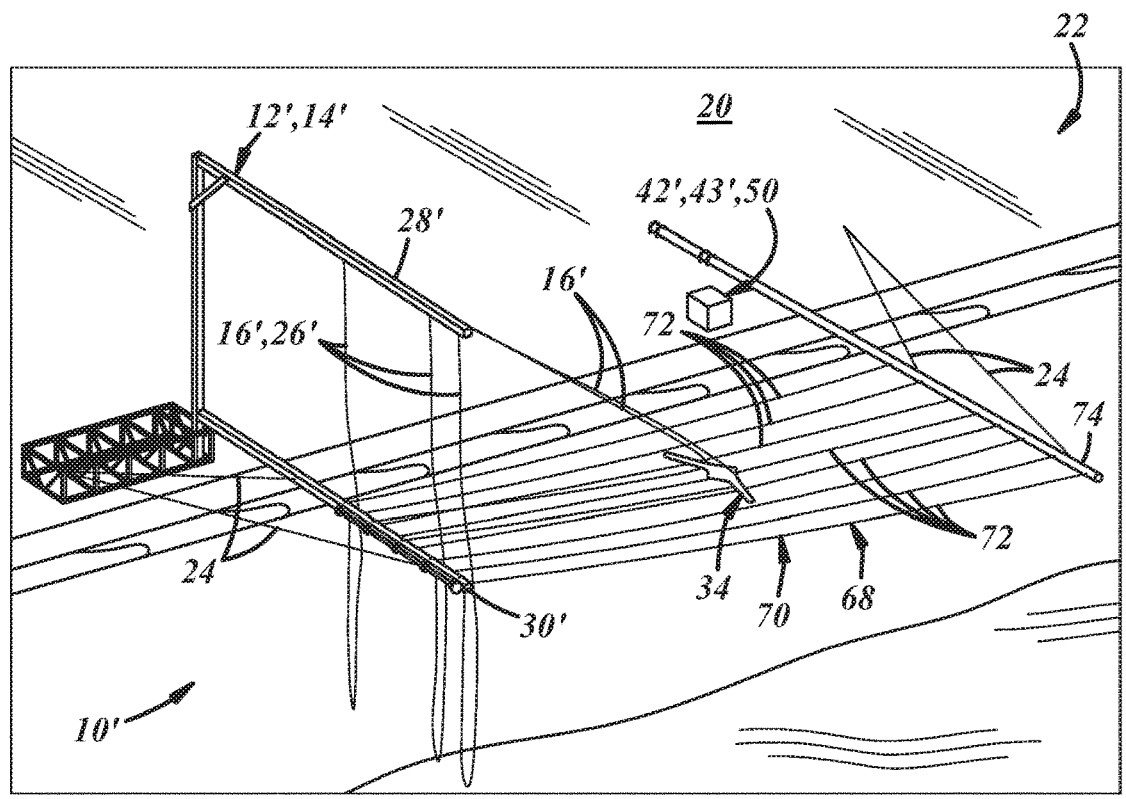
FIG. 6 is a perspective view of the UAV of FIGS. 4 and 5 approaching a horizontal cable capture apparatus (HCC) of the UAV capture system embodiment of FIGS. 4 and 5.
Figure 7:
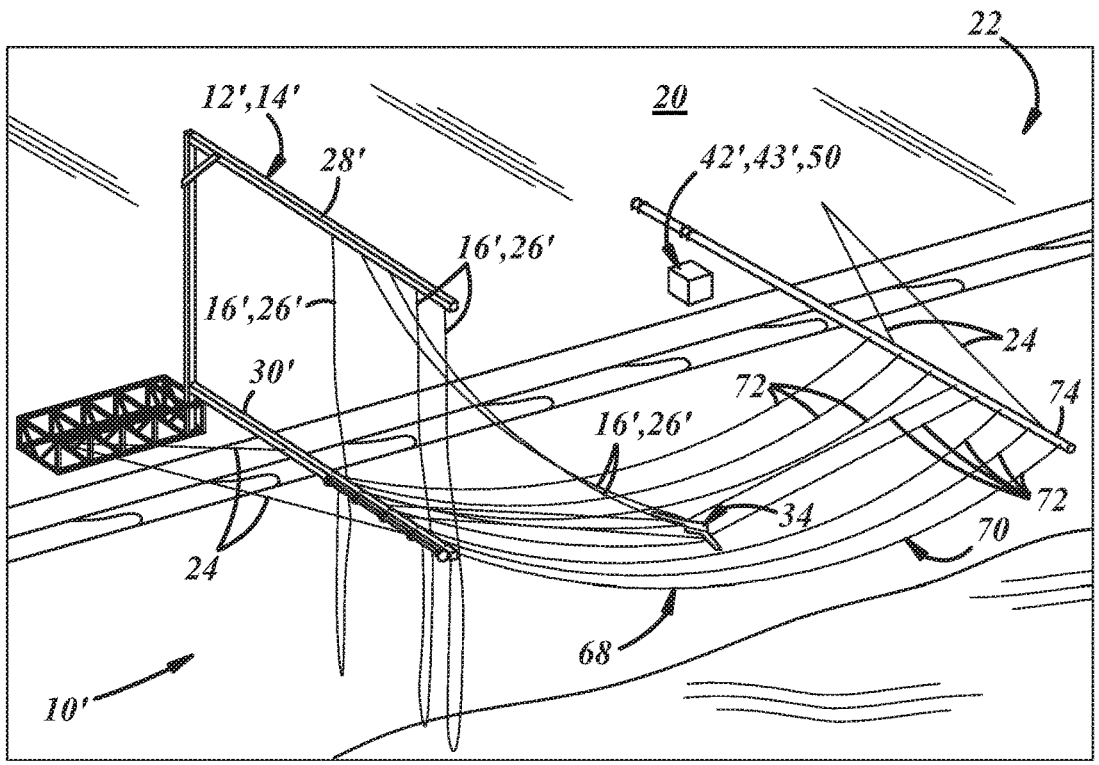
FIG. 7 is a perspective view of the UAV of FIGS. 4-6 engaged in the HCC of the UAV capture system embodiment of FIGS. 4-6.

In practice, a UAV 34 may be captured by flying a UAV 34 into the VCC cables 16 of the UAV capture system 10' such that the port and starboard cable catches 36 in the wings 38 of the UAV 34 engage two of the cables 16 of the VCC cable array. The two VCC cables 16 then pay out as the VCC brake 60 resists the payout in such a way as to gradually decelerate the UAV 34.

Where the UAV capture system is constructed according to the first embodiment, as the UAV 34 decelerates, loses flying airspeed, and descends, the two VCC cables 16 drape over the cable catch bar 66, defining a pivot point around which the UAV 34 swings downward and is suspended from the paid-out VCC cables 16, preferably without striking a surface below the UAV capture system 10, as shown in FIG. 3.

Where the UAV capture system is constructed according to the second embodiment, as the UAV 34 decelerates and descends, it engages the HCC cables 72 of the HCC landing pad 70. The HCC payout apparatus then allows the engaged HCC cables 72 to pay out, with the HCC brake 77 resisting the payout and absorbing whatever kinetic energy the UAV 34 might still possess. The HCC payout apparatus may be configured such that the HCC cables 72 that are not engaged by the UAV 34, pay out as well and hang slack as shown in FIG. 7. Likewise, according to the second embodiment, the VCC payout apparatus may be configured such that the VCC cables 16' that are not engaged by the UAV 34, pay out as well and hang slack as shown in FIGS. 6 and 7.

A system constructed or method executed as described above allows a UAV to be captured in mid-flight with minimal risk of damage. The inclusion of a cable catch bar or landing pad allows the UAV to be supported once it has decelerated below flying airspeed and until its kinetic energy is fully depleted, without risking collision with a surface or object below.

We claim:

1. A UAV capture system comprising:
   a first cable support structure;
   a first cable array comprising at least two cables carried by the first cable support structure in respective positions such that at least respective portions of the two cables are spaced-apart;
   port and starboard catches disposed on respective port and starboard wings of a UAV to be captured, and positioned to engage the spaced-apart cable portions when the UAV flies into the spaced-apart cable portions;
   a first cable array payout apparatus connected to the cables of the first cable array and comprising a payout device that pays out the cables after they have been engaged by the UAV to be captured and resists such pay out to decelerate the UAV; and
   a cable catch bar positioned for the cables of the first cable array to drape over the cable catch bar and suspend a captured UAV following UAV engagement.

2. The UAV capture system of claim 1 in which the first cable array pay out apparatus includes a brake operable to decelerate the UAV by resisting pay out of the cables of the first cable array following UAV engagement.

3. The UAV capture system of claim 1 in which the first cable array pay out apparatus includes cable guides carried by the first cable support structure and arranged to guide the cables of the first cable array as they pay out from the payout device.

4. The UAV capture system of claim 1 in which mid portions of the cables of the first cable array are supported between vertically-spaced upper and lower cable support arms of the first cable support structure such that the mid-portions of the cables of the first cable array are disposed in linear, vertical, parallel, spaced-apart orientations.

5. A UAV capture system comprising:
a first cable support structure;
a first cable array comprising at least two cables carried by the first cable support structure in respective positions such that at least respective portions of the two cables are spaced-apart, mid portions of the cables of the first cable array being supported between vertically-spaced upper and lower cable support arms of the first cable support structure such that the mid-portions of the cables of the first cable array are disposed in linear, vertical, parallel, spaced-apart orientations;
port and starboard catches disposed on respective port and starboard wings of a UAV to be captured, and positioned to engage the spaced-apart cable portions when the UAV flies into the spaced-apart cable portions, the port and starboard catches being covered by frangible fairings shaped to a curvature of the UAV wing leading edges where the catches are located; and
a first cable array payout apparatus connected to the cables of the first cable array and comprising a payout device that pays out the cables after they have been engaged by the UAV to be captured and resists such pay out to decelerate the UAV.

6. The UAV capture system of claim 5 in which the port and starboard catches comprise respective port and starboard protrusions carried by and extending forward from the respective port and starboard wings of the UAV.

7. The UAV capture system of claim 5 in which the cables of the first cable array comprise laterally-protruding bumps carried by the cables' respective mid portions.

8. The UAV capture system of claim 5 further comprising a landing pad positioned to receive and support the UAV as the cables of the first cable array pay out and diminish forward motion of the UAV.

9. The UAV capture system of claim 8 in which the landing pad comprises a second cable array that comprises a plurality of cables disposed below and in alignment with a flight path of the UAV to be captured and that are laterally spaced-apart from one another.

10. The UAV capture system of claim 9 in which the landing pad comprises:
a cable support arm connected to forward ends of the cables of the second cable array and disposed forward of the first cable support structure;
a cable payout rod connected to aft ends of the cables of the second cable array and carried by the first cable support structure.

11. A UAV capture system comprising:
a first cable support structure;
a first cable array comprising at least two cables carried by the first cable support structure in respective positions such that at least respective portions of the two cables are spaced-apart;
port and starboard catches disposed on respective port and starboard wings of a UAV to be captured, and positioned to engage the spaced-apart cable portions when the UAV flies into the spaced-apart cable portions;
a first cable array payout apparatus connected to the cables of the first cable array and comprising a payout device that pays out the cables after they have been engaged by the UAV to be captured and resists such pay out to decelerate the UAV;
a landing pad positioned to receive and support the UAV as the cables of the first cable array pay out and diminish forward motion of the UAV;
a second cable array that comprises a plurality of cables disposed below and in alignment with a flight path of the UAV to be captured and that are laterally spaced-apart from one another;
a second cable array payout apparatus comprising a cable payout rod supported on the first cable support structure for rotation about a longitudinal rod axis and cables including windings that are wound around the payout rod prior to UAV engagement, and unwound from the payout rod as the cables of the second cable array pay out following UAV engagement of two or more cables of the second cable array.

12. The UAV capture system of claim 11 in which the second cable array payout apparatus comprises a second cable array brake operable to decelerate the UAV by resisting pay out of the cables of the second cable array.

13. The UAV capture system of claim 12 in which the second cable array brake may include:
a brake disk coaxially fixed to the cable payout rod; and
a brake caliper carried by the first cable support structure in a position to releasably apply clamping pressure to the brake disk.

\* \* \* \* \*